(12) United States Patent
Onfroy et al.

(10) Patent No.: US 9,422,054 B2
(45) Date of Patent: Aug. 23, 2016

(54) SYSTEM FOR MAINTAINING A PRESSING FORCE BY THE COMBINED ACTION OF TWO MEMBERS

(71) Applicant: MESSIER-BUGATTI-DOWTY, Velizy-Villacoublay (FR)

(72) Inventors: Dominique Onfroy, Velizy-Villacoublay (FR); Thomas Lepage, Velizy-Villacoublay (FR); Franck Selles, Velizy-Villacoublay (FR); Frédéeric Ragot, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 0 days.

(21) Appl. No.: 14/060,083

(22) Filed: Oct. 22, 2013

(65) Prior Publication Data
US 2014/0116821 A1 May 1, 2014

(30) Foreign Application Priority Data

Oct. 26, 2012 (FR) ...................................... 12 60228

(51) Int. Cl.
*B64C 25/44* (2006.01)
*B60T 8/17* (2006.01)
*B60T 7/04* (2006.01)
*B60T 7/08* (2006.01)
(Continued)

(52) U.S. Cl.
CPC ................ *B64C 25/44* (2013.01); *B60T 7/042* (2013.01); *B60T 7/085* (2013.01); *B60T 8/1703* (2013.01); *B60T 13/741* (2013.01); *F16D 55/38* (2013.01)

(58) Field of Classification Search
CPC ......... B60T 8/00; B60T 8/1703; B60T 8/325; B60T 13/74; B60T 13/741; B60T 13/746; B64C 25/42; B64C 25/426; B64C 25/44; F16D 2121/24; F16D 55/36
See application file for complete search history.

(56) References Cited

U.S. PATENT DOCUMENTS

| 2005/0104446 A1* | 5/2005 | Chico et al. ................... 303/155 |
| 2006/0152074 A1* | 7/2006 | Chico et al. ..................... 303/89 |
| 2006/0152080 A1* | 7/2006 | Chico et al. ................... 303/191 |

(Continued)

FOREIGN PATENT DOCUMENTS

| EP | 1 679 453 A1 | 7/2006 |
| FR | 2 954 742 A1 | 7/2011 |
| WO | WO 2011110363 | * 9/2011 |

OTHER PUBLICATIONS

French Search Report for FR 1260228 dated Jun. 28, 2013.
(Continued)

*Primary Examiner* — Vishal Sahni
(74) *Attorney, Agent, or Firm* — Sughrue Mion, PLLC

(57) ABSTRACT

An aircraft electromechanical braking system comprising a braking control unit 10 and at least one electromechanical brake 1, the brake 1 being fitted with at least one electromechanical actuator 4 having a pusher 6 suitable for being moved by means of an electric motor 7. The actuator 4 also has a blocking member 8 for blocking the pusher 6 in position. The control unit 10 is adapted to cause the braking system to operate in an additional braking mode referred to as "combined" mode, in which the motor 7 is activated to bring the pusher 6 into a position in which it exerts a given holding force, and then the blocking member 8 is activated, while activation of the motor 7 is maintained.

12 Claims, 2 Drawing Sheets

(51) Int. Cl.
  *B60T 13/74*  (2006.01)
  *F16D 55/38*  (2006.01)

(56) References Cited

U.S. PATENT DOCUMENTS

2007/0084677 A1* 4/2007 Thibault et al. .............. 188/71.5
2011/0079471 A1* 4/2011 Colin et al. ................. 188/106 P
2014/0100719 A1* 4/2014 Thibault ........................... 701/3

OTHER PUBLICATIONS

French Written Opinion for FR1260228 dated Oct. 26, 2012.

* cited by examiner

SYSTEM FOR MAINTAINING A PRESSING FORCE BY THE COMBINED ACTION OF TWO MEMBERS

This application claims priority from French Patent Application No. 12 60228 filed Oct. 26, 2012, the contents of all of which are incorporated herein by reference in their entirety.

The invention relates to an aircraft electromechanical braking system comprising braking control means and at least one electromechanical brake fitted to at least one braked wheel of the aircraft.

BACKGROUND OF THE INVENTION

The electromechanical brakes of an aircraft braking system conventionally comprise a stack of friction disks and a plurality of electromechanical actuators, each of which has a pusher suitable for being moved by means of an electric motor in order to selectively apply a pressing force on the stack of disks. The actuators also include a blocking member for blocking the pusher in position.

Such electromechanical brakes are generally designed to operate in three braking modes, referred to herein as "controlled" mode, "parking" mode, and "protection" mode.

In controlled mode, which is activated as a result of a pilot of the aircraft actuating brake pedals or an automatic braking lever, braking control means associated with a brake receive a controlled braking setpoint and they deliver electrical power to the electric motor of each actuator of the brake so that the actuator generates a pressing force corresponding to the setpoint. By way of example, the control means comprise an electromechanical actuator controller (EMAC) and an electronic braking control unit (EBCU).

In parking mode, which is activated as a result of the pilot actuating a parking selector, the control means deliver electrical power to the electric motor so as to bring the pusher into a position in which it exerts a certain pressing force, and then they activate the blocking member to block the pusher, and they deactivate the motor. Parking mode is used during stages of parking for the purpose of keeping the aircraft stationary when it needs to be prevented from moving on the ground for a certain period of time. Given the variations in the dimensions of the components of the brake (heat sink, torque tube, plate for holding the heat sink, etc.) as a function of temperature, the force to be maintained varies over time and it is necessary to provide for the control means to implement adjustments in order to adjust the position of the pusher.

Protection mode makes it possible to protect the electric motors of the actuators by switching off their power supply in order to prevent their temperature from becoming too great. The blocking members of the actuators are then activated and act on their own to maintain the looked-for pressing force. Protection mode is generally activated as a result of a command that is internal to the braking system, in a manner that is transparent for the pilot.

In parking and protection modes, the pressing force is referred to as a "holding" force, i.e. a pressing force that is maintained solely by the action of the blocking member on the pusher.

It is found that the parking and protection modes can be used in situations that apply high levels of stress on the brakes.

It can thus happen that parking mode is used to prevent an aircraft from moving while carrying out thrust tests on propulsion engines. The holding force that the blocking members of the actuators need to be able to maintain is then very high.

When a pilot uses controlled mode to hold an aircraft stationary at a runway stop point, the aircraft having its propulsion engines in action, it is possible that the temperature of the electric motors of the actuators becomes too high as a result of delivering a maintaining force for a long waiting period. Protection mode is then activated by the braking system, thus requiring blocking members to be dimensioned so as to be capable of maintaining this holding force, which can be large.

Such uses of a blocking member in parking and protection modes presents two technical difficulties that are frequently encountered by the designers of braking systems or of brake actuators.

The first difficulty concerns the logic used for making adjustments when the aircraft is in a parking stage. This logic involves causing the position of the pusher to be adjusted. When the way in which the holding force varies is not known, adjustments are performed by applying high forces, thereby tending to age the actuators prematurely.

In addition, the blocking members are often dimensioned as a function of the pressing force needed for holding the aircraft stationary at a runway stop point or when performing thrust tests. Since these situations require a holding force that is much greater than that needed during a parking stage, the blocking members are overdimensioned considerably relative to the usual needs during a parking stage.

OBJECT OF THE INVENTION

An object of the invention is to solve the above-described technical difficulties.

SUMMARY OF THE INVENTION

In order to achieve this object, the invention provides an aircraft electromechanical braking system comprising braking control means and at least one electromechanical brake fitted to at least one braked wheel of the aircraft, the brake being fitted with friction members and with at least one electromechanical actuator having a pusher suitable for being moved by means of an electric motor in order to selectively apply a pressing force against the friction members, the actuator also having a blocking member for blocking the pusher in position, the control means being adapted to cause the braking system to operate at least in a controlled mode in which the electric motor is controlled to selectively apply a pressing force in response to a braking setpoint, or in a parking mode in which the motor is controlled to bring the pusher into a position in which it exerts a parking force on the friction members, and then the blocking member is activated and the motor is deactivated. According to the invention, the control means are adapted to cause the braking system to operate in an additional braking mode referred to as "combined" mode, in which the motor is activated to bring the pusher into a position in which it exerts a given holding force, and then the blocking member is activated, while activation of the motor is maintained in order to enable the pusher to develop an additional force above the holding force.

Combined action of the blocking member and of the motor makes it possible to generate a relatively large force that is greater than the holding force that the blocking member is capable of maintaining on its own, thus enabling the aircraft to be held stationary at a runway stop point or while performing engine thrust tests without needing to overdimension the blocking member or the electric motor (since the amount it heats up is limited).

In addition, by activating the combined mode in a parking stage, it is possible to detect variations in pressing force that result from variations in the dimensions of the brake by observing the electric current consumed by the electric motors, thus making it possible to evaluate more accurately the need for adjusting the pressing force. This avoids the need to adjust the position of the pusher excessively or too often, thereby reducing the risk of premature aging of the actuators.

BRIEF DESCRIPTION OF THE DRAWINGS

The invention can be better understood in the light of the following description given with reference to the figures of the accompanying drawings, in which.

DETAILED DESCRIPTION OF THE INVENTION

Figure 1:
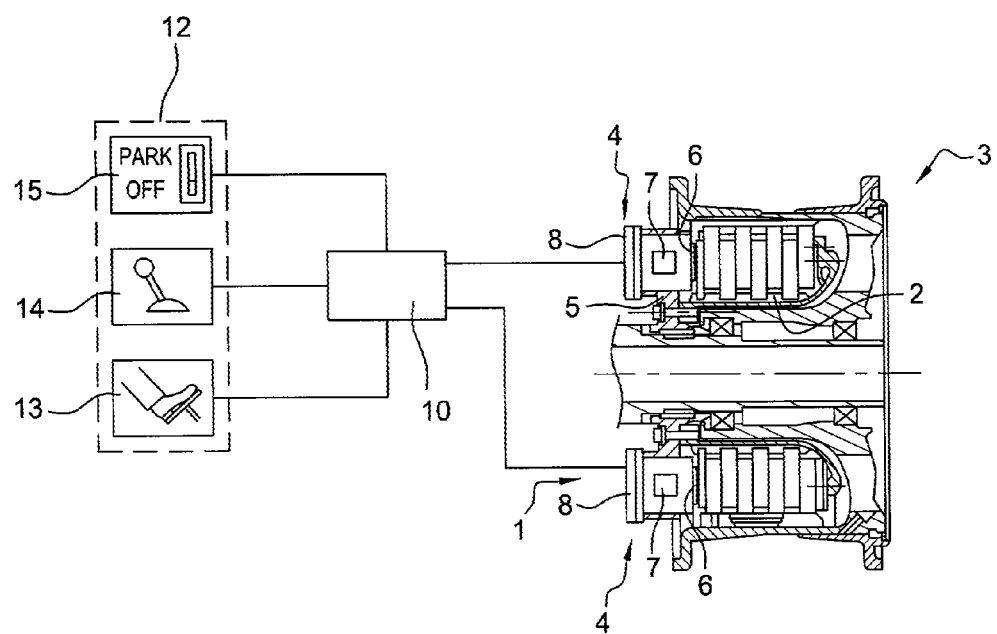
FIG. 1 shows a wheel fitted with an electromechanical brake incorporated in a braking system of the invention.

With reference to FIG. 1, an electromechanical brake 1 of an aircraft comprises friction members, in this example a stack of disks 2 comprising in alternation disks that are constrained to rotate with the wheel 3 for braking and disks that are stationary in rotation.

The electromechanical brake 1 also has a plurality of actuators 4 (two are shown) that are carried by an actuator carrier 5 in order to extend facing the stack of disks 2. Each actuator 4 has a pusher 6 suitable for being moved by means of an electric motor 7 towards the stack of disks 2 in order to press against it and thus generate a pressing force, together with a blocking member 8 enabling the pusher 6 to be blocked in a previously-established position. In this example, the blocking member 8 is dimensioned for everyday use in a parking stage, and it is not overdimensioned to allow for use during thrust testing or when stopping the aircraft at a stop point of a runway.

In addition to the electromechanical brakes similar to the brake 1 and fitted to the braked wheels of the aircraft, the braking system of the invention also has braking control means 10 for controlling the actuators of the brakes.

The braking system of the invention is designed to operate in at least four braking modes:
  a braking mode referred to as "controlled" mode;
  a braking mode referred to as "parking" mode;
  a braking mode referred to as "protection" mode; and
  a braking mode referred to as a "combined" mode.

In controlled mode, the control means 10 receive a braking instruction issued as a result of the pilot actuating brake pedals 13 in the cockpit 12 of the aircraft, or actuating a lever referred to as an autobrake 14 that engages automatic braking, and in response to the instruction they issue a braking setpoint. The control means 10 respond to this setpoint by generating and modulating electrical power for delivery to the electric motor 7 of each actuator 4.

In parking mode, the control means 10 receive directly a parking braking instruction issued as a result of the pilot actuating a parking selector 15. The control means 10 then generate electrical power for the electric motor 7 of each actuator 4 so as to enable the motor 7 to bring the pusher 6 of the actuator into a position in which it exerts a parking force on the stack of disks 2. The control means 10 then activates the blocking member 8 of each actuator 4 in order to block the pusher 6 in position, and they then deactivate the motor 7. The control means 10 repeat these steps regularly in order to adjust the parking force, since it might have changed as a result of the dimensions of the brake components varying as a function of temperature.

Protection mode is activated (when the aircraft is at a standstill) as a result of the control means 10 detecting that the temperature of one or more electric motors 7 exceeds a certain threshold. The control means 10 then prevent the motors from being powered, and they activate the blocking members 8 of the corresponding actuators 4. The blocking members 8 are capable on their own of maintaining the looked-for pressing force.

It should be observed that during braking performed in any of these three modes, the electric motor 7 and the blocking member 8 of an actuator 4 are not controlled in such as a manner as to be active simultaneously, with the possible exception of short transient periods.

In combined mode, the control means 10 receive a braking instruction and they generate a combined braking setpoint. The control means 10 then activate the motor 7 by delivering electrical power thereto, and the motor brings the pusher into a position in which it exerts a certain pressing force. The control means 10 then activate the blocking member 8 so that it blocks the pusher 6 in position. The motor continues to be activated so that under the combined action of the motor 7 and of the blocking member 8 the pusher 6 develops an additional force greater than the holding force exerted by the blocking member 8 on its own, thus also making it possible to reduce the electrical power consumption of the motor and consequently to reduce its heating.

Combined mode is for taking the place of parking mode or of protection mode under particular predefined conditions corresponding to two main needs:
  making it possible to maintain a pressing force greater than the maintaining force of the parking member on its own; and
  monitoring variations in the pressing force in situations in which parking mode is normally used (while parking, etc.).

In this example, the combined braking instruction is generated automatically by a command internal to the braking system, e.g. as a result of:
  detecting simultaneous commands for parking mode and for engine thrust (where this detection corresponds for example to a situation in which the engine thrust is being tested);
  detecting an engine thrust command when the temperature of the brake actuator motor is too high (where such detection corresponds for example to a situation of keeping the aircraft stationary at a runway stop point); and
  detecting a parking mode command requiring a pressing force to be maintained that is greater than a threshold (where such detection corresponds to a parking stage in which the level of pressing force required is high).

In a thrust test situation or in a situation of keeping the aircraft stationary at a runway stop point, combined mode is used to apply a relatively large pressing force on the stack of disks 2, greater than the holding force that the blocking device is capable of maintaining on its own.

Figure 2A:
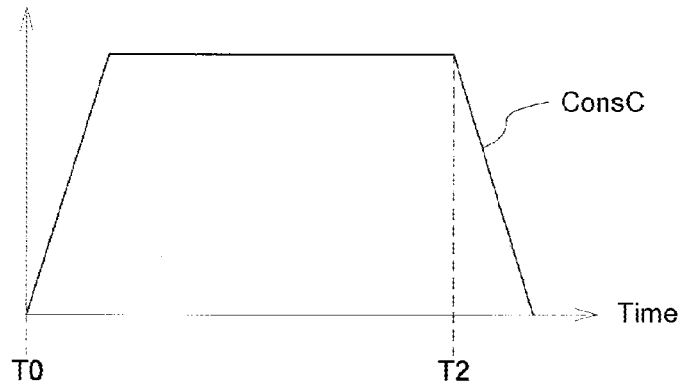
FIG. 2a shows a braking force setpoint as a function of time.
Figure 2B:
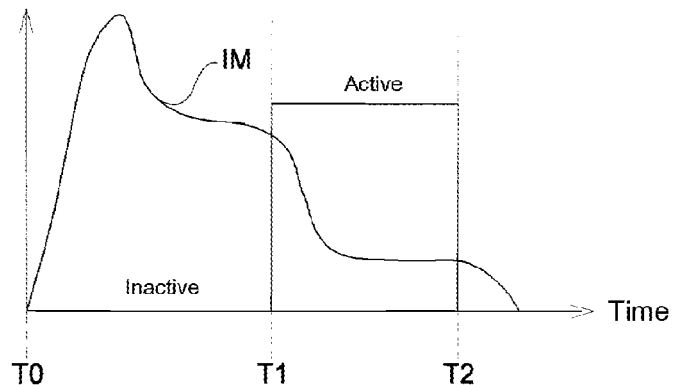
FIG. 2b shows a signal for activating a blocking member of an actuator and the current consumed by an electric motor of the actuator in response to the braking setpoint.
Figure 2C:
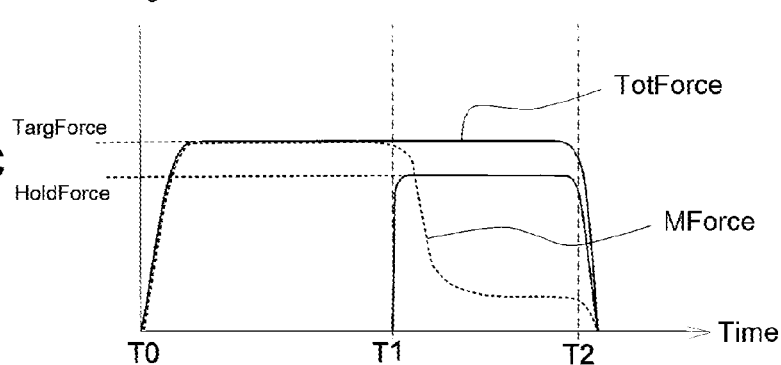
FIG. 2c shows a total pressing force resulting from the combined action of the electric motor and of the blocking member, together with the contributions to this total pressing force from the motor and from the blocking member.

Thus, as can be seen in FIGS. 2a, 2b, and 2c, when the control means 10 receive an instruction in the period from time T=T0 to T=T2 to perform combined mode braking in order to achieve a target pressing force TargForce, they generate a braking setpoint SetP. At T=T0, the control means 10 power the motor 7 by delivering motor current IM thereto. This motor current IM enables the motor to be controlled so that it moves the pusher in order to generate a motor pressing force MForce equal to the target pressing force TargForce. The blocking member 8 is inactive at that time. The total force TotForce, generated by the combined action of the motor and of the blocking member is therefore equal to the force MForce.

The motor 7 is controlled to maintain the force TargForce for a certain duration, until time T=T1. The blocking member 8 is kept inactive between T0 and T1.

Thereafter, at T=T1, the blocking member 8 is activated. The blocking member blocks the pusher and maintains a holding force HoldForce. The pressing force MForce generated by the motor 7 is decreased, and the contribution of the motor to the total pressing force TotForce becomes relatively small. The total force TotForce is thus equal to the sum of the forces HoldForce plus MForce.

Thus, between the times T=T1 and T=T2, the combined action of the motor and of the blocking member enables a total pressing force TotForce to be generated that is equal to the target pressing force TargForce that is greater than the holding force HoldForce of the blocking member.

This target pressing force may be relatively large and it enables the aircraft to be held stationary in a stop point situation or in an engine thrust test situation or in a parking situation without overdimensioning the blocking member or the electric motor.

The combined mode of the braking system of the invention is also particularly advantageous for adjusting the parking force when the aircraft is in a parking stage.

This adjustment can be carried out in such a manner as to perform exactly the number of adjustments that are needed for maintaining a target pressing force. In combined mode, the control means 10 cause the blocking member 8 to block the pusher 6 in position while simultaneously causing the electric motor 7 to deliver a constant pressing force on a continuous basis. The motor 7 is thus continuously powered, thus making it possible, as a result of acquiring measurements of the current consumed by the motor, to evaluate the variations in the pressing force applied by the actuator.

In combined mode during a parking stage, in order to control the motor 7 of the actuator 4, three current thresholds are defined that are referenced Isat, Smin, and Smax.

The threshold Isat is a current threshold for limiting the current consumption of the motor 7 during the parking stage. This threshold thus makes it possible to ensure that electricity consumption is not too penalizing, given the capacity of the aircraft battery in use.

The thresholds Smin and Smax are current thresholds used for determining accurately the moment at which it is necessary to adjust the position of the pusher 6. In the event of the dimensions of the components of the brake 1 varying, the parking force that is to be maintained varies, thereby giving rise to variation in the current consumed. The thresholds Smin and Smax are dimensioned so that if the current consumed by the motor is less than Smin or greater than Smax, that means it is necessary to adjust the position of the pusher 6 so that the required parking force is maintained between acceptable limits.

Parking adjustment is triggered by the control means 10 that control a target parking maintaining force. For this purpose, they control the motor 7 so that it generates a motor braking torque producing the target pressing force, the blocking member then being inactive.

The motor 7 then acts on its own for a short instant to maintain this target pressing force.

Thereafter, the blocking member 8 is activated and it maintains a holding force. The motor braking torque is reduced, but is nevertheless maintained so that the actuator continues to produce a target pressing force greater than the holding force.

The trigger thresholds Isat, Smin, and Smax are then activated.

When the current consumed by the motor 7 becomes less than Smin or greater than Smax, the control means 10 make an adjustment. This adjustment consists in unblocking the blocking member 8, in positioning the pusher 6 in a position in which it exerts the target pressing force, and then in reactivating the blocking member 8, while continuing to power the motor 7.

It should be observed that detecting passage of the current above the threshold Smax is activated only when the blocking member is not activated.

This adjustment is repeated throughout the parking stage, for the time in which the power supply is available, on each occasion that the current becomes less than Smin or greater than Smax.

Since the electric motor 7 is activated continuously during this parking stage, the pressing force produced by the actuator serves to compensate for small variations in parking force. This avoids making adjustments at too great a level or making adjustments too frequently and thus pointlessly, and as a result any risk of premature aging of the actuators is reduced, as is the electricity consumption of the motors.

The invention is not limited to the particular embodiment described above, but on the contrary covers any variant coming within the ambit of the invention as defined by the claims.

Although a simplified architecture is used for illustrating the braking system of the invention, the invention naturally covers a braking system of some other architecture, providing it includes braking control means that control at least one electromechanical actuator having an electric motor, a pusher, and a blocking member. Provision may thus be made to use control means constituted by one or more braking computers (EBCU), and one or more actuator controllers (EMAC), to provide the brakes with some arbitrary number of actuators, etc.

Although it is stated above that the combined mode is put into operation automatically, as a result of particular situations being detected by the braking system, it is also possible to provide a control member in the cockpit to enable the pilot to activate combined mode.

The invention claimed is:

1. An aircraft electromechanical braking system comprising:
   braking control means (10) and at least one electromechanical brake (1) fitted to at least one braked wheel (3) of the aircraft,
   wherein the brake (1) is fitted with friction members (2) and with at least one electromechanical actuator (4) having a pusher (6) suitable for being moved by means of an electric motor (7) in order to selectively apply a pressing force against the friction members (2), the actuator (4) also having a blocking member (8) for blocking the pusher (6) in position,
   wherein the control means (10) is configured to cause the braking system to operate at least in a controlled mode in which the electric motor (7) is controlled to selectively apply a pressing force in response to a braking setpoint, or in a parking mode in which the motor (7) is controlled to bring the pusher (6) into a position in which it exerts a parking force on the friction members (2), and then the blocking member is activated and the motor is deactivated, and wherein the control means (10) also is configured to cause the braking system to operate in a combined mode, in which:

first, the motor (7) is activated to bring the pusher (6) into a position in which it exerts a given holding force, second, the given holding force is maintained solely by the blocking member, and then activation of the motor (7) is maintained, whereby the motor alone develops an additional pressing force, a total pressing force against the friction members (2) being the sum of the given holding force and the additional pressing force.

2. The braking system according to claim 1, characterized in that the control means (10) are adapted:

to control the electric motor (7) to bring the pusher into a position in which it exerts a target pressing force greater than the holding force, the blocking member (8) being inactive;

to activate the blocking member (8) to block the pusher (6) of the electromechanical actuator (4) when the pusher exerts a force equal to the holding force;

to reduce the force generated by the motor; and to maintain activation of the motor in order to enable the pusher (6) to develop a force equal to the target force.

3. The braking system according to claim 1, characterized in that the control means (10) are also adapted, in combined mode, to adjust the position of the pusher when the electric current consumed by the electric motor (7) becomes greater than a maximum current threshold (Smax) or less than a minimum current threshold (Smin).

4. The braking system according to claim 3, characterized in that an adjustment in the position of the pusher consists in:

deactivating the blocking member (8);

controlling the electric motor (7) to bring the pusher into a position in which it exerts the target pressing force; and activating the blocking member (8), while maintaining activation of the motor in order to enable the pusher (6) to develop a force equal to the target force, and then reducing the force generated by the motor.

5. The braking system according to claim 1, characterized in that the combined mode is activated by detecting a command for braking in parking mode that is simultaneous with thrust from a propulsion engine of the aircraft, or by detecting a command for a parking braking mode to generate a pressing force greater than a predefined force threshold, or by the pilot taking action on an actuator member.

6. The braking system according to claim 1, characterized in that the electricity consumption of the motor (7) is limited by a predefined current threshold (Isat).

7. The braking system according to claim 2, characterized in that the combined mode is activated by detecting a command for braking in parking mode that is simultaneous with thrust from a propulsion engine of the aircraft, or by detecting a command for a parking braking mode to generate a pressing force greater than a predefined force threshold, or by the pilot taking action on an actuator member.

8. The braking system according to claim 2, characterized in that the electricity consumption of the motor (7) is limited by a predefined current threshold (Isat).

9. The braking system according to claim 3, characterized in that the combined mode is activated by detecting a command for braking in parking mode that is simultaneous with thrust from a propulsion engine of the aircraft, or by detecting a command for a parking braking mode to generate a pressing force greater than a predefined force threshold, or by the pilot taking action on an actuator member.

10. The braking system according to claim 3, characterized in that the electricity consumption of the motor (7) is limited by a predefined current threshold (Isat).

11. The braking system according to claim 4, characterized in that the combined mode is activated by detecting a command for braking in parking mode that is simultaneous with thrust from a propulsion engine of the aircraft, or by detecting a command for a parking braking mode to generate a pressing force greater than a predefined force threshold, or by the pilot taking action on an actuator member.

12. The braking system according to claim 4, characterized in that the electricity consumption of the motor (7) is limited by a predefined current threshold (Isat).

* * * * *